Patented Jan. 4, 1949

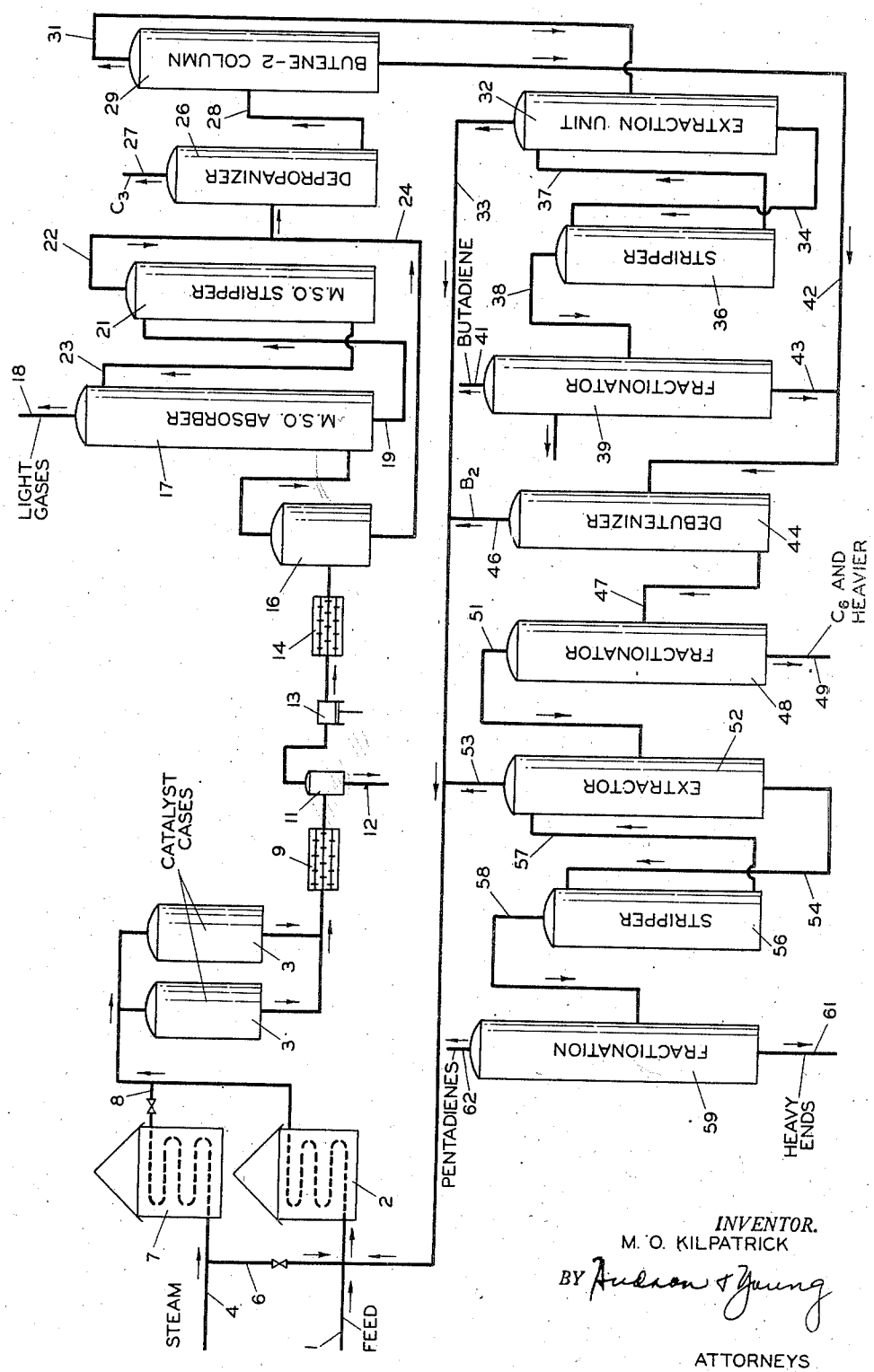

2,458,082

UNITED STATES PATENT OFFICE 2,458,082

PRODUCTION OF DIOLEFINS

Myron O. Kilpatrick, Bartlesville, Okla., assignor to Phillips Petroleum Company, a corporation of Delaware Application August 6, 1946, Serial No. 688,623

10 Claims. (Cl. 260—680)

This invention relates to the dehydrogenation of hydrocarbons for the manufacture of diolefins. In one of its more specific aspects, the present invention relates to the dehydrogenation of hydrocarbons containing four and five carbon atoms per molecule simultaneously to produce a mixture of butadiene and isoprene.

It is known that diolefins may be produced by the cracking or dehydrogenation of hydrocarbons. Butadiene may be prepared by the dehydrogenation of butane and butylenes; pentadiene and isoprene by the dehydrogenation of pentane and amylenes. Various amounts of the four and five carbon atom diolefins may also be obtained by the cracking of petroleum. Butadiene and related diolefins have been found in numerous instances among the products of low pressure pyrolysis of various hydrocarbons, including both paraffins and olefins. In general, the diolefin yields obtained by simple pyrolysis are low. On the other hand, the dehydrogenation of paraffins and olefins with the use of contact type dehydrogenation catalysts results in much higher yields of diolefins. The yields of diolefins are improved in some instances by dehydrogenation at low pressure or in the presence of diluents such as steam, flue gas, methane, and the like. The present invention is concerned with the catalytic dehydrogenation of paraffins and olefins to produce diolefins, and particularly with the simultaneous dehydrogenation of four and five carbon atom paraffins and olefins to produce a mixture of four and five carbon atom diolefins.

Diolefins, especially 1.3-butadiene, 1.3-pentadiene, and isoprene (2-methyl-1.3-butadiene) are valuable as monomers in the polymerization processes for the production of synthetic rubbers. Synthetic rubbers may be produced from diolefins individually or in admixture with other polymerizable organic monomers. The most widely used synthetic rubber at the present time is GR—S, a product produced by copolymerization of 1.3-butadiene and styrene. Similar copolymers of 1.3-pentadiene and isoprene are produced and are especially suited to some uses. The choice of the diolefin used in the manufacture of synthetic rubber depends to a large extent upon the use to which the resulting product is to be put. Hence both the four and five carbon atom diolefins are valuable as starting materials for the production of synthetic rubbers.

Heretofore, the dehydrogenation of olefins and paraffins for the production of diolefins has been specific; for example, n-butane and n-butylenes are used almost exclusively for the production of 1.3-butadiene while n-pentane and amylenes are used to produce pentadiene and isoprene. It has been proposed to produce butadiene by the catalytic treatment of the butene-containing hydrocarbon mixture resulting from the dehydrogenation of normal butane. However, so far as I am aware, the use of a mixture of pentane or amylene with butylene and simultaneous dehydrogenation of the mixture to produce mixed diolefines has not been heretofore carried out. By the process of the present invention it is possible to obtain good yields of both 1.3-butadiene and isoprene in a single operation. My process is used to produce an effluent containing the mixed diolefins from which substantially pure butadiene and isoprene may be separately recovered. My invention provides for the economical production of butadiene by catalytic dehydrogenation and also includes the production of substantial amounts of isoprene or pentadiene in the same dehydrogenation step with little, if any, effect on the butadiene capacity.

An object of this invention is to provide an improved process for the production of diolefins. Another object is to provide a process for the dehydrogenation of four and five carbon atom hydrocarbons simultaneously to produce a mixture of four and five carbon atom diolefins. Still another object is to provide a process wherein commercial quantities of isoprene may be produced incidentally to the production of butadiene. Other objects and advantages will be apparent to those skilled in the art from the following detailed description.

The accompanying drawing is the diagrammatic flow sheet illustrating the various steps in the production and recovery of diolefins by the process of the present invention.

At the present time butadiene is produced in large quantities by the catalytic dehydrogenation of n-butylenes. Either 1-butene, 2-butenes, or a mixture of the n-butylenes, may be used for catalytic dehydrogenation to butadiene. In carrying out the dehydrogenation, butylenes are generally admixed with steam in proportion within the range of from about 3 to 10 volumes of steam per volume of butylene. In general, the pressure is kept within the range of from about atmospheric to about 50 pounds per square inch gage. Low pressures are favorable to the dehydrogenation reaction; pressures below atmospheric pressure result in increased conversion to the desired diolefin. From a practical standpoint, however, it is desirable to use pressures at least as high as atmospheric pressure to prevent leakage of air into the system. In most operations, the pressure at the inlet to the catalyst zone is at least sufficiently above atmospheric pressure to cause flow through the zone at the desired rate with a pressure somewhere in the neighborhood of atmospheric pressure at the outlet of the catalyst zone. Partial pressures of less than atmospheric pressure and desirably below 0.5 atmospheres may be maintained within the catalyst chamber by dilution with steam or other inert diluent in sufficient volume.

Other diluent gases which may be used comprise the hydrocarbons more refractory than the four carbon atom hydrocarbons, particularly methane and propane, and other inert gases, especially carbon dioxide, hydrogen and nitrogen. Generally, water vapor or steam is the preferred diluent due to its availability and beneficial effect in the dehydrogenation reaction. While hydrogen may be used, the presence of any considerable amount of it when the partial pressure of the olefins is also low adversely affects the equilibrium in the olefin-diolefin conversion.

Space velocities of from about 500 to about 5000 volumes of feed per volume of catalyst per hour may be used. Space velocities within the range of from about 700 to about 1500 volumes of feed per volume of catalyst per hour are preferred.

By the process of the present invention the $C_5$ diolefins, and in particular isoprene, are produced simultaneously with the production of butadiene by dehydrogenation. By this process the production of butadiene from butylenes is substantially unaffected while substantial quantities of five carbon atom diolefins are simultaneously produced. A part of the five carbon atom olefin is converted to butadiene, thus supplementing the yield of butadiene from butylenes. The advantages of the process will be readily apparent to those skilled in the art.

According to the present invention a feed stream is made up comprising a five carbon atom hydrocarbon more saturated than the diolefin, e. g., pentane or an amylene. Pentane or the various amylenes individually or in admixture with one another may be used in the process of this invention. From about 5 to about 20 volumes of the five carbon atom hydrocarbons are used with from about 70 to about 95 volumes of butylene. Of the various amylenes, 2-pentanes and trimethylethylene (2-methyl-2-butene) are preferred. Trimethylethylene is preferred for the production of isoprene and is converted to isoprene with very little production of other diolefins. Pentene-2 yields a mixture of butadiene and five carbon atom diolefins. The dehydrogenation of 2-pentenes yields mainly 1,3-butadiene, some 1,3-pentadiene (piperylene) and perhaps some isoprene. Trimethylethylene yields mainly isoprene, some butadiene, and occasionally some piperylene. The overall yield of diolefins based on 2-pentenes or trimethylethylene charged to the dehydrogenation may be as high as from about 35% to about 45%.

A typical refinery $C_5$ fraction has approximately the following composition: 1-pentene, 9%; 2-pentenes, 17%; trimethylethylene, 9%; unsymmetrical methylethylethylene (2-methyl-1-butene), 5%; and the remainder predominantly pentane. Such a mixture may be used as the $C_5$ feed for admixture with butylenes in the process of the present invention. The amylenes may be separated from the refinery fraction by solvent extraction with a polar solvent capable of exerting a preferential solvent action upon olefins as distinguished from paraffins and upon the desirable higher-boiling amylenes 2-pentenes and trimethylethylene as distinguished from the less desirable low-boiling amylenes (1-pentene and unsymmetrical amylene). Catalytic isomerization may be employed to increase the concentration of 2-pentenes and also trimethylethylene in the $C_5$ stream. This step converts 1-pentene largely to 2-pentenes and also converts unsymmetrical amylene to trimethylethylene. Thus concentration of the desirable higher-boiling amylenes is increased at the expense of the less desirable low-boiling amylenes. This isomerization is well known in the art and forms no part of the present invention.

A specific modification of the invention is illustrated in the accompanying figure wherein a hydrocarbon feed stream comprising 80 to 90 per cent butylenes and from 5 to 10 per cent five carbon atom hydrocarbons, such as a concentrated mixture of 2-pentenes and trimethylethylene, enters the system through pipe 1 and passes through a preheating furnace 2 into the catalyst chamber 3. In the pre-heater 2 the feed is heated to approximately the desired conversion temperature, preferably to a temperature within the range of from about 1100 to about 1200° F. Steam or other stable gaseous diluent enter the system through pipe 4 and may be passed via line 6 to the feed stream entering furnace 2 or it may pass from pipe 4 to a separate furnace 7 and thence through pipe 8 to the inlet of the catalyst chamber 3. In the furnace 7 the diluent is heated to a temperature a least as high as the conversion temperature.

In some instances it is desirable to heat the diluent to a temperature somewhat above the conversion temperature such that admixture of the preheated diluent and preheated feed stock prior to introduction to the catalyst case results in a mixture of feed and diluent having the desired conversion temperature. This latter method of operation is sometimes advantageous in that it results in quickly heating the feed from a temperature below that at which non-catalytic conversion begins to the conversion temperature immediately prior to introduction to catalyst zone. While a partial uncatalyzed conversion is permissible and even sometimes desirable with low steam to hydrocarbon ratios, the efficiency of the conversion to desired products is improved by rapidly preheating the feed stream and introducing it into the catalyst zone before substantial conversion occurs. The dehydrogenation is carried out by passing the preheated reactants in admixture with the diluent over a catalyst in the zone 3. The dehydrogenation zone may conveniently be in the form an insulated vessel containing a large bed of dehydrogenation catalyst in granular or pellet form supported by a suitable means such as a perforated plate or series of perforated plates vertically spaced through the catalyst bed. The catalyst, which is more fully discussed hereinafter, may also but less desirably be disposed in tubes of small diameter with provision for heat transfer to the catalyst and reactants through the wall of the tube by heat exchange with hot gases. Effective dehydrogenation catalysts and arrangements of apparatus are well known in the art and need little, if any, discussion in the present disclosure.

From the catalyst cases the dehydrogenation effluent passes to a cooler 9 where it is cooled to a temperature below that at which conversion, decomposition or other undesirable reactions take place. Water vapor is condensed, the condensate separated from the gaseous effluent in separator 11, and withdrawn through line 12, the dehydrogenation effluent is then compressed in the compression system 13 to a pressure of about 200 pounds per square inch and cooled by cooler 14 to substantially atmospheric temperature. Compression and cooling of the effluent gases causes some condensation. The condensed portion of the effluent is separated from the vaporous portion in accumulator 16. Vapors from accumulator 16 are passed to a mineral seal oil absorber 17 operated to effect recovery of substantially all four carbon atom and heavier hydrocarbons from the gas. Propane and lighter hydrocarbons are unabsorbed and pass via line 18 out of the system for use as fuel in the plant. Rich oil, that is, mineral seal oil containing absorbed $C_4$ and heavier hydrocarbons, passes from absorber 17 via line 19 to a mineral seal oil stripper 21 wherein the absorbed hydrocarbons are released from the absorption oil. Lean absorption oil passes from the stripper to the absorber via line 23.

Condensate from accumulator 16 is passed through line 24 to a depropanizer 26. Recovered $C_4$ and heavier hydrocarbons from stripper 21 are passed through line 22 to the depropanizer in admixture with the condensate from the accumulator. In the depropanizer 26, which is a fractional distillation column, any residual propane and lighter hydrocarbons are eliminated from the diolefin-containing stream. The light hydrocarbons are taken overhead from the depropanizer through line 27 for use as fuel or for other purposes. Butane and higher-boiling hydrocarbons are withdrawn from the base of the depropanizer and passed via line 28 to the butene-2 column 29.

The effluent from the dehydrogenation step comprises a mixture of hydrogen, propane and lighter hydrocarbons, normal butane, normal pentane 1-butene, 2-butenes (cis and trans), butadiene, 1-pentene, 2-pentenes, unsymmetrical amylene, trimethylethylene, pentadiene, isoprene and small amounts of higher boiling hydrocarbons. The boiling points of the various four and five carbon atom hydrocarbons are as follows:

| Component | Boiling Point, °F. |
| --- | --- |
| 1-Butene | 21 |
| 1,3-Butadiene | 24 |
| trans-2-Butene | 34 |
| cis-2-Butene | 39 |
| 3-Methyl-1-Butene | 68 |
| 1-Pentene | 86 |
| 2-Methyl-1-Butene | 88 |
| 2-Methyl Butadiene-1,3 (isoprene) | 93 |
| trans-2-Pentene | 97 |
| cis-2-Pentene | 99 |
| 2-Methyl-2-butene (trimethylethylene) | 101 |
| 1,3-Pentadiene (piperylene) | 108 |

In the butene-2 column 29 a fractional distillation column the $C_4$ and $C_5$ hydrocarbons are cut into two fractions: a higher-boiling fraction comprising cis-2-butene and higher boiling hydrocarbons and a lower-boiling fraction comprising trans-2-butene and lower boiling hydrocarbons.

The trans-2-butene and the lower-boiling hydrocarbons from the 2-butene column pass via line 31 to a solvent extraction unit 32. In unit 32 a separation is made by a selective solvent between the butylenes and the butadiene. Butadiene is selectively absorbed while the butylenes, which are unabsorbed, are taken overhead and recycled through line 33 to the feed stream entering through line 1. The solvent passes from the absorber 32 through line 34 to a stripper 36 where the butadiene is separated from the solvent, and the solvent is returned to the absorber 32 through line 37. The butadiene thus substantially freed from butylenes is withdrawn through line 38 to fractionator 39. Substantially pure butadiene is taken from fractionator 39 through line 41 as product. The higher boiling hydrocarbon fraction from the butene-2 column 29, comprising removed cis-2-butene is removed through line 42 and admixed with any 2-butenes or higher-boiling hydrocarbons withdrawn from the base of fractionator 39 through line 43 and this mixture is passed to a fractional distillation column 44 known as a debutenizer.

In the debutenizer 44, 2-butenes and lower-boiling hydrocarbons are separated from the $C_5$ and heavier hydrocarbons and withdrawn through line 46 for recycling to the feed stream entering the system through line 1. The $C_5$ and heavier hydrocarbons are passed through line 47 to a fractional distillation column 48 wherein the $C_6$ and heavier hydrocarbons are separated from the $C_5$ stream. The $C_6$ and heavier hydrocarbons are removed from the fractionator through line 49. The $C_5$ stream is passed through line 51 to an extractor 52 wherein a separation is made by a selective solvent between the five carbon atom diolefins and the less unsaturated $C_5$ hydrocarbons. The amylenes, which are not dissolved, pass through line 53 and are recycled together with the butylene from line 46 to the feed stream. The solvent passes from the absorber 52 through line 54 to stripper 56 where the diolefins are separated, and the solvent is returned to absorber 52 through line 57. The diolefin mixture thus substantially freed of amylenes and other less unsaturated hydrocarbons is taken through line 58 to fractionation system 59 for final separation. Any hydrocarbons higher boiling than the desired diolefins are withdrawn from the fractionation system 59 through line 61. The five carbon atom diolefins are taken from the fractionation system through line 62 and may be subjected to further purification steps to separate isoprene and if desired, 1,3-pentadiene, from other less desirable diolefins.

Various modifications of the process illustrated in the figure will be obvious from my disclosure and no attempt will be made to discuss all of the possibilities within the scope of my invention. For example, the separation of $C_3$ and lighter material from the effluent of the dehydrogenation step may be performed in a single fractionation or with other auxiliary operations such as refrigeration and the like. Also other methods for separating butadiene and isoprene from the dehydrogenation effluent may be utilized without departing from the spirit of the present invention. It will be evident also that the selective absorption steps might be combined to recover a mixture of butadiene and the five carbon atom diolefins which may then be subsequently separated by any of various methods.

It will be obvious to one skilled in the art that the accompanying flow diagram is illustrative only and that valves, condensers, fractionation reflux lines and other auxiliary equipment have been omitted for the sake of simplification. It is believed, however, that the figure clearly illustrates the various process steps of this specific modification of my invention and that the figure taken together with the accompanying description will clearly explain this modification to those skilled in the art.

In the operation of the dehydrogenation step the charge stock is prepared in such proportions that partial pressure of olefins is less than one atmosphere and preferably in the range of 0.2 to 0.5 atmosphere. The other constituents of the mixture are principally paraffins and steam together with any $C_3$ hydrocarbons or other diluent which may be added.

The effluent of the catalytic dehydrogenation step is cooled to condense and separate water and any high boiling polymer or tar. The method of cooling may be designed to provide an extremely rapid reduction of temperature, such as the introduction of water or other quenching mediums. After separation of the condensate the hydrocarbon vapors are compressed, cooled and processed to remove hydrocarbons higher and lower boiling than the desired $C_4$ and $C_5$ hydrocarbons in a series of separational steps.

In the process of this invention the effluent vapors from the dehydrogenation step are processed to separate any high boiling material formed by the catalytic treatment, and to remove propane and lower boiling gaseous by-products. The separation of light gases is indicated in two stages, that is, separation of the gases from the condensate in accumulator 16 followed by a vapor recovery system to recover $C_4$ and heavier hydrocarbons from the light gases, and fractional distillation in depropanizer 26 to effect removal of propane and lighter hydrocarbons retained in the condensate in accumulator 16 or absorbed by the mineral seal oil absorber 17. Hydrogen-containing gas from either the mineral seal oil absorber or the depropanizer may be returned to the feed stock ahead of the catalyst if desired. Precautions should be observed in such an operation to avoid building up concentrations of hydrogen to the point where the dehydrogenation reaction is suppressed.

The stream taken overhead through line 27 from the depropanizer 26 contains a relatively high percentage of propylene. If desired, a part of the stream from the depropanizer may be recycled to the dehydrogenation step as a part of the diluent gases used therein. The propylene is a potential hydrogen acceptor capable of promoting the dehydrogenation reaction. At least a portion of the $C_3$ hydrocarbons must be removed from the system to prevent pyramiding an excessive recirculation of this relatively insert material which increases the compression requirement of the process. In any event substantially complete separation of propane is desirable prior to the diolefin purification steps indicated in the process.

The recovery of the diolefins from the resulting unsaturated hydrocarbon mixture may be effected by the method illustrated or by other known processes which produce substantially equivalent results. Solvent extraction, azeotropic distillation and chemical processes such as the formation of a complex, for example, sulfones or cuprous salt complexes, are known to be effective methods for use in the separation and purification of diolefins.

The catalysts used in the dehydrogenation step are those of satisfactory activity in promoting selective olefin dehydrogenation at temperatures within the range of 1100 to 1400° F. and in the presence of water vapor. Those catalysts which are particularly suited to the process of the present invention are catalysts comprising a mixture of metal oxides. Promoters of the water gas reaction may be advantageously included in the catalyst composition. Catalysts which have been found particularly effective for use in the process of this invention are those prepared by treatment of bauxite or alumina with the oxide or hydroxide of barium or strontium in such a manner that the adsorbent metal oxide carrier is impregnated with the metal compound. The oxides of aluminum and magnesium have been found to give especially satisfactory catalysts as have also those of zirconium and titanium. Both synthetic preparations of the substantially pure oxides, hydrated oxides, or hydroxides, and also natural mineral ores comprising those oxides yield satisfactory catalysts. High porosity or specific surface and other qualifications of good catalysts are desirable in these materials. Other catalysts which have been found particularly suited to the practice of the presents invention are those of approximately the following composition:

| | Per cent by weight |
|---|---|
| Iron oxide | 93 |
| Chromium oxide | 5 |
| Potassium hydroxide | 2 | and

| | Per cent by weight |
|---|---|
| Aluminum oxide | 89 |
| Barium oxide | 5 |
| Magnesium oxide | 3 |
| Potassium hydroxide | 3 |

Catalysts may be prepared by impregnating pellets, granules, or particles of the latter insoluble metal oxide carrier material, e. g. aluminum oxide, iron oxide and the like, with an aqueous solution of the soluble components followed by evaporation of water. The catalysts specifically mentioned above may be prepared in this manner. These catalysts do not lose activity to any appreciable extent in contact with steam at elevated temperatures. The catalysts mentioned are selective to dehydrogenation and cause very little cracking or polymerization reactions to take place. It is to be understood, however, that other catalysts of satisfactory activity in promoting selective olefin dehydrogenation in the presence of water vapor at temperatures within the range of 1100 to 1400° F. may be employed in the present process.

Steam is particularly desired as a diluent in conjunction with water resistant catalysts, i. e., those which maintain high activity in the presence of steam, in that the water vapor reduces the deposition of tar or carbon on the catalyst during the conversion period. Water resistant catalysts of the type described hereinabove result in prolonged period of maximum catalyst activity and greatly reduce time requirements for reactivation.

The following specific example illustrates a specific application of my process without implying any unnecessary limitations thereto.

A four carbon atom feed stream containing approximately 95 per cent butenes by volume is admixed with a five carbon atom feed stream containing approximately 90 per cent amylenes by volume and with steam. The mixture is preheated to the desired dehydrogenation temperature and passed over a catalyst comprising aluminia admixed with about 5 weight per cent barium hydroxide to produce diolefins. The steam is preheated and admixed with the hydrocarbon feed stream just prior to contact of the catalyst. Operating conditions are within the range indicated below:

Composition of hydrocarbon feed:   Per cent by vol.
Butylenes _____ 80–90
C5 (Amylenes) _____ 5–10
Butane _____ 5–10

Steam-hydrocarbon ratio 8:1–15:1
Temperature of the catalyst cases 1000–1300° F.
Pressure of the catalyst cases 20–30 psia A mixture comprising approximately 65 per cent 2-pentenes and 35 per cent trimethylethylene is used as the amylene feed in this example. The effluent from the catalyst cases is cooled, compressed and processed for the removal of C3 and lighter hydrocarbons and C5 and heavier hydrocarbons as indicated in the accompanying flow diagram. A fractionation is made between trans-2-butene and lower boiling C4 hydrocarbons and cis-2-butene and C5 hydrocarbons. Butadiene is separated from the C4 stream and the five carbon atom diolefins are separated from the C5 stream by extractive distillation with furfural. The butadiene yield is about 55 weight per cent based on the butylenes reacted and the isoprene yield is about 45 weight per cent based on trimethylethylene reacted. Unconverted C4 and C5 olefins and paraffins are recycled to the dehydrogenation step. Yields are expressed as weight per cent (ultimate yields) based on the hydrocarbon reacted. The yield of isoprene is at a maximum when substantially pure trimethylethylene is used as the C5 in the feed stream. When 2-pentenes are used as the C5 in the feed stream the butadiene yield is increased approximately 3 per cent based on the butylenes reacted due to the fact that 2-pentenes yield 1,3-butadiene in amount equivalent to about 30 weight per cent of the 2-pentenes reacted. The yield of five carbon atom diolefins from 2-pentenes, the yield amounting to about 10 per cent by weight based on the 2-pentenes reacted is correspondingly reduced.

Since the present invention may be practiced otherwise than as specifically described herein and since various modifications and variations of the process will be apparent to those skilled in the art, the foregoing descriptive matter should be construed as illustrative only and not as limiting to the invention.

I claim:

1. A process for the production of diolefins which comprises contacting a mixture of butenes and about 5 to about 10 volume per cent of 5 carbon atom hydrocarbons more saturated than diolefins at a temperature within the range of from about 1000 to about 1300° F. with a dehydrogenation catalyst in the presence of from about 8 to about 15 volumes of steam per volume of hydrocarbon.

2. A process for the production of diolefins which comprises passing butene in admixture with from about 5 to about 10 volume per cent of a C5 hydrocarbon more saturated than a diolefin into contact with a dehydrogenation catalyst at a temperature within the range of from about 1000 to about 1300° F. in the presence of from about 8 to about 15 volumes of steam per volume of hydrocarbon mixture.

3. A process for the production of diolefins which comprises passing butene in admixture with from about 5 to about 10 volume per cent of pentene into contact with a dehydrogenation catalyst at a temperature within the range of from about 1000 to about 1300° F. in the presence of from about 8 to about 15 volumes of steam per volume of hydrocarbon mixture.

4. A process for the production of diolefins which comprises passing a mixture of butene and 2-pentene into contact with a dehydrogenation catalyst at a temperature within the range of from about 1000 to about 1300° F. in the presence of from about 8 to about 15 volumes of steam per volume of hydrocarbon mixture.

5. A process for the production of diolefins which comprises passing a mixture of butene and trimethylethylene into contact with a dehydrogenation catalyst at a temperature within the range of from about 1000 to about 1300° F. in the presence of from about 8 to about 15 volumes of steam per volume of hydrocarbon mixture.

6. A process for the production of diolefins which comprises admixing butene with pentene in the ratio of about 80 to 90 parts by volume of butene to 5 to 10 parts by volume of pentene, admixing the resulting mixture with steam in an amount equivalent to from about 8 to about 15 volumes of steam per volume of hydrocarbon mixture and passing the steam-hydrocarbon mixture into contact with a dehydrogenation catalyst at a temperature within the range of from about 1000 to about 1300° F. and at a pressure within the range of from about 0 to about 100 pounds per square inch gage.

7. A process for the production of diolefins which comprises admixing butene with pentene in the ratio of about 80 to 90 parts by volume of butene to 5 to 10 parts by volume of pentene, admixing the resulting mixture with steam in an amount equivalent to from about 8 to about 15 volumes of steam per volume of hydrocarbon mixture and passing the steam-hydrocarbon mixture into contact with a dehydrogenation catalyst comprising a mixture of metal oxides at a temperature within the range of from about 1000 to about 1300° F. and at a pressure within the range of from about 0 to about 100 pounds per square inch gage.

8. A process for the production of diolefins which comprises admixing butene with 2-pentene in the ratio of about 80 to 90 parts by volume of butene to 5 to 10 parts by volume of 2-pentene, admixing the resulting mixture with steam in an amount equivalent to from about 8 to about 15 volumes of steam per volume of hydrocarbon mixture and passing the steam-hydrocarbon mixture into contact with a dehydrogenation catalyst comprising a mixture of metal oxides at a temperature within the range of from about 1000 to about 1300° F. and at a pressure within the range of from about 0 to about 100 pounds per square inch gage.

9. A process for the production of diolefins which comprises admixing butene with trimethylethylene in the ratio of about 80 to 90 parts by volume of butene to 5 to 10 parts by volume of trimethylethylene, admixing the resulting mixture with steam in an amount equivalent to from about 8 to about 15 volumes of steam per volume of hydrocarbon mixture and passing the steam-hydrocarbon mixture into contact with a dehydrogenation catalyst comprising a mixture of metal oxides at a temperature within the range of from about 1000 to about 1300° F. and at a pressure within the range of from about 0 to about 100 pounds per square inch gage.

10. A process for the production of mixed C4 and C5 diolefins which comprises contacting a mixture of a plurality of $C_4$ hydrocarbons including a substantial amount of unsaturates and about 5 to about 10 volume per cent of a plurality of $C_5$ hydrocarbons including a substantial amount of unsaturates at a temperature within the range of about 1000 to about 1300° F. with a suitable dehydrogenation catalyst in the presence of from about 8 to about 15 volumes of steam per volume of hydrocarbon mixture under conditions of time and pressure which produce $C_4$ and $C_5$ diolefins.

MYRON O. KILPATRICK.

REFERENCES CITED

The following references are of record in the file of this patent:

UNITED STATES PATENTS

| Number | Name | Date |
|---|---|---|
| 2,385,484 | Wright | Sept. 25, 1945 |